W. E. PORTER & A. L. R. ELLIS.
ELECTRICAL MEASURING INSTRUMENT.
APPLICATION FILED MAY 6, 1914.
1,241,275.
Patented Sept. 25, 1917.
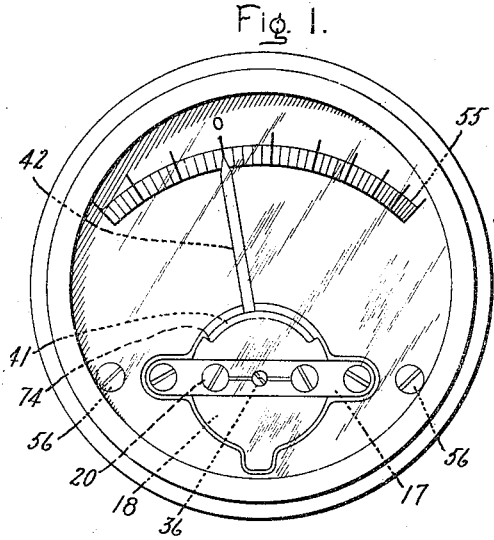
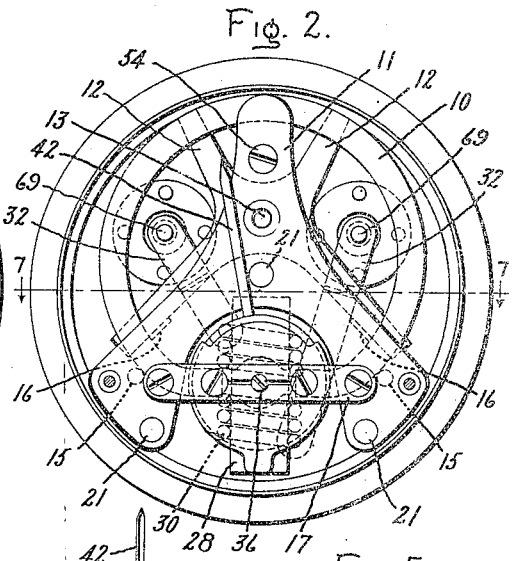
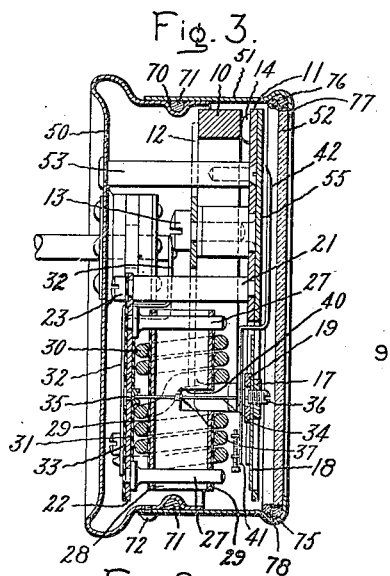
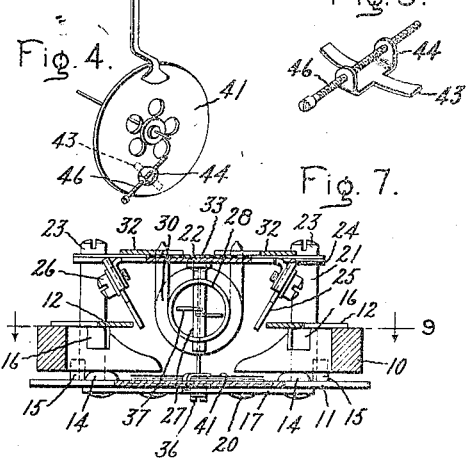
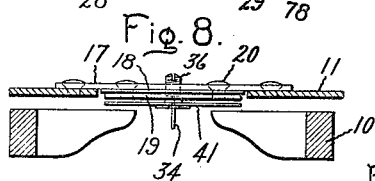
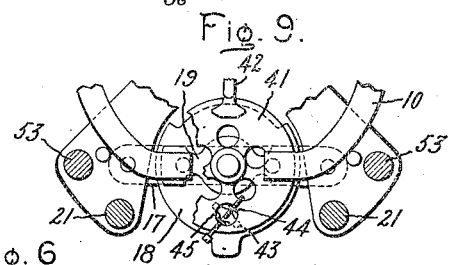
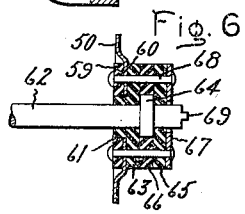
Witnesses:
Chas. B Stokes
J. Ellis Glen.
Inventors:
Willard E. Porter,
Alvarado L. R. Ellis,
by Albert G. Davis
His Attorney

UNITED STATES PATENT OFFICE.

WILLARD E. PORTER AND ALVARADO L. R. ELLIS, OF LYNN, MASSACHUSETTS, ASSIGNORS TO GENERAL ELECTRIC COMPANY, A CORPORATION OF NEW YORK.

ELECTRICAL MEASURING INSTRUMENT.

1,241,275.   Specification of Letters Patent.   Patented Sept. 25, 1917.

Application filed May 6, 1914. Serial No. 836,647.

*To all whom it may concern:*

Be it known that we, WILLARD E. PORTER and ALVARADO L. R. ELLIS, citizens of the United States, residing at Lynn, county of Essex, State of Massachusetts, have invented certain new and useful Improvements in Electrical Measuring Instruments, of which the following is a specification.

Our invention relates to electrical measuring instruments, and in particular to electrical measuring instruments having a permanent magnet and a stationary current carrying coil adapted to produce magnetic fields at angles to each other and a magnetic armature member movably mounted within the influence of each component of the resultant magnetic field.

The objects of our invention are to generally improve the construction of electrical measuring instruments of the type above referred to, and to provide a simple and compact instrument which is cheap to manufacture and efficient in operation. A further object of our invention is to provide a novel construction of current indicating instrument particularly adapted for use with batteries on automobiles. More specifically the objects of our invention are to provide a novel construction of electrical measuring instrument of the type above referred to in which the movable element has a relatively large torque and at the same time is substantially dead beat. A further object of our invention is to provide in an instrument of the above type a novel construction of combined indicating, damping and counter-balancing member, and still further to provide a novel and improved counter-balance device. Other objects of our invention will be noted hereinafter.

The principal objects of our invention are attained by a novel arrangement of the operative elements of the instrument. These operative elements comprise a permanent magnet, a stationary current carrying coil producing a flux at an angle to the flux of the magnet, and an unrestrained magnetic armature member movably mounted within the influence of each component of the resultant magnetic field. The novel arrangement of these elements, in accordance with our invention, permits the use of a strong permanent magnet necessary to obtain damping, but allows the armature to be influenced by only a small portion of the permanent magnet flux, and further permits the use of a weak field from the current being measured, and, consequently, a field coil of few turns and small electrical losses. In carrying out our invention, the greater portion of the magnetic flux of the permanent magnet is employed for magnetically damping the movable element, thereby rendering the instrument substantially dead beat; while the movable magnetic armature is subjected to only that small portion of the magnet's flux which is necessary to maintain the armature polarized. Thus, in our improved and novel construction of instrument the main flux of the permanent magnet is employed for damping and only the stray flux of the magnet is employed for influencing the movable magnetic armature.

The features of our invention which we consider patentably novel are definitely indicated in the claims appended hereto. The details of construction and mode of operation of an electrical measuring instrument embodying the novel features of our invention will be understood from the following description taken in connection with the accompanying drawings, in which:

Figure 1 is a top view of the instrument; Fig. 2 is likewise a top view of the instrument with the cover and scale plate removed; Fig. 3 is a cross-sectional view of the instrument; Fig. 4 is a perspective view of the combined indicating, damping and counterbalancing member; Fig. 5 is a perspective view of the counter-balance device; Fig. 6 is a sectional view of the terminal construction; Fig. 7 is a detail sectional view taken on the section line 7—7 of Fig. 2, looking in the direction of the arrows; Fig. 8 is a detail view partly in section illustrating the main magnetic shunt and damping disk; and Fig. 9 is a detail sectional view taken on the section line 9—9 of Fig. 7, looking in the direction of the arrows and with the damping disk partly broken away.

All of the operative elements of the instrument are secured to a Y-shaped plate 11, thereby forming a unitary structure, which can be removed from the instrument casing as a unit. A permanent magnet 10 is clamped between the Y-shaped plate and an X-shaped plate 12 by means of a bolt 13, as will be best seen in Figs. 2 and 3 of the drawings. The permanent magnet is circular in configuration and is of the horseshoe type having oppositely positioned poles. The plates 11 and 12 are of non-magnetic material. The Y-shaped plate has lugs 14 attached to the surface adjacent the magnet 10 and adapted to suitably space the magnet from the plate. Pins 15 on the Y-shaped plate and extensions 16 on the X-shaped plate engage the sides of the magnet and properly determine the position of the magnet with respect to the plates, and further serve to securely maintain this proper position when the magnet is clamped between the two plates.

A bar 17 of non-magnetic material is secured to the Y-shaped plate in a position directly above the poles of the magnet, and a guard plate 18 of non-magnetic material and a plate 19 of magnetic material are secured to the bar 17 by screws 20. The magnetic plate 19 is arranged directly above the poles of the magnet and is separated therefrom by small air gaps. This plate forms a main magnetic shunt for the magnet through which the greater portion of the magnet's flux passes.

Three posts 21 are rigidly secured to the Y-shaped plate and extend below the magnet. A bottom plate 22 of magnetic material is secured to the posts by bolts 23. The magnetic plate 22 is provided with extensions 24 located directly beneath the poles of the permanent magnet. Shielding plates 25 are adapted to be secured to the extensions 24 by set-screws 26. Each shielding plate is provided with a slot through which the set-screw extends, and, accordingly, the position of the shielding plates with respect to the poles of the magnet can be adjusted. The shielding plates 25 and bottom plate 22 thus provide a path for a portion of the flux of the permanent magnet, and the amount of flux which takes this path can be adjusted by means of the adjustable shielding plates 25.

Two studs 27 are secured to the bottom plate 22 and have mounted thereon a cylindrical supporting member 28. This supporting member is of non-magnetic material and may be a metal tube having a film of insulating material 29 on its outside surface. A current carrying or field coil 30 is wound on the supporting member 28 and is insulated from the bottom plate 22 by a strip of insulating material 31. It will of course be understood that the supporting member 28 may take various forms and may in fact be entirely omitted where the wire of the coil 30 is coarse enough. The terminals of the current carrying coil extend through openings in the bottom plate 22 and are soldered to connection strips 32, which serve as current conductors to connect the coil to the terminals of the instrument. A piece of insulating material 33, such as fiber, covers the bottom of the plate 22 and separates the plate from the connection strips 32, and also from the terminals of the coil 30, where the latter pass through the plate 22. The soldering of the field coil terminals to the connection strips 32 constitutes at once the necessary electrical connections for the coil 30 and the mechanical fastening which secures the supporting member 28, coil 30, insulating material 31, connection strips 32 and insulating material 33 together in unit assembly.

The movable element of the instrument comprises a shaft 34 mounted for unrestrained movement in a lower pivot bearing 35 secured to the plate 22 and an upper bearing screw 36 secured to the bar 17. The bar is slotted, as indicated in Figs. 1 and 2 of the drawings, to afford a means for holding the bearing screw in position without the aid of a check nut.

The armature 37 of the instrument consists of a magnetic member such as a piece of magnetic wire coiled about the shaft 34 and firmly secured thereto. By reference to Fig. 3 of the drawings it will be seen that the armature 37 is located within the cylindrical supporting member 28, and within the magnetic influence of the field produced by the flow of a current through the coil. The upper part of the supporting member has a semi-circular slot 40 through which the shaft 34 extends, and through which the armature can be conveniently inserted within the member. Reference to Figs. 3 and 7 of the drawings will show the position of the armature and the current carrying coil with respect to the poles of the permanent magnet. It will be noted that the armature is positioned below the poles of the magnet and is not influenced by the main magnetic flux. The armature is, in fact, as hereinafter more clearly explained, subjected to only that portion of the magnet's flux which is required to magnetically polarize the armature and maintain it normally, when no current is flowing in the current carrying coil, in a position parallel to a line between the poles of the magnet. The current carrying coil 30 is likewise positioned below the poles of the magnet, and not directly between these poles as heretofore in instruments of this general type.

A circular damping disk 41 is secured to the pivoted shaft 34, and is positioned in the air gaps between the poles of the magnet and the magnetic shunting plate 19. An indicating member or pointer 42 is secured to one side of the damping disk 41 and a counterbalance device is adjustably mounted on the diametrically opposite side of the disk. The counterbalance device comprises a spring clip 43 having two projections 44 extending through a circular hole 45 in the disk. The length of the spring clip is greater than the diameter of the hole 45 and movement of the clip through the hole in one direction is thus prevented. The projections 44 are provided with registering apertures in which a screw-threaded counter-balance arm 46 is operatively positioned. The material of the projections is so thin that the threads on the counterbalance arm are engaged thereby, thus eliminating the necessity of threading the apertures. The arms of the spring clip 43 contact with the disk 41 and exert a spring tension tending to pull the projections 44 back through the hole 45, which at once serves to hold the spring clip and the counter-balance arm definitely in position, but permits the ready adjustment of each of these members. By turning the spring clip, the entire counterbalance device can be rotated in the hole 45, and by turning the counterbalancing arm the position of the arm with respect to the spring clip can be altered. These two movements provide the necessary counterbalancing adjustments.

The parts of the instrument hereinbefore described are all secured to the Y-shaped plate and form a single unitary structure. This construction provides an instrument which is easily assembled and which is adapted to be quickly and conveniently removed from its inclosing casing for repair and inspection. The inclosing casing for the instrument comprises a back member 50 and a front cover 51 having a circular glass window 52. Three posts 53 are secured to the back member 50 and are positioned to support the unitary instrument structure. To this end the three arms of the Y-shaped plate 11 are provided with holes which register with screw-threaded holes in the posts 53. A single screw 54 serves in the first instance to secure the Y-shaped plate to the back member 50. A scale plate 55 rests upon the top surface of the Y-shaped plate 11 and has two holes which register with the other two holes in the plate 11 and with the corresponding screw-threaded holes in the posts 53. Screws 56 pass through each of these three registering holes, thereby firmly securing the instrument structure and scale plate to the back member 50.

Two terminals are rigidly secured to the back member 50. The construction of these terminals and the mode of securing them to the back member is clearly indicated in Fig. 6 of the drawings. The back plate is pressed inwardly at two points to provide recessed or offset portions 60 for the accommodation of the terminal construction. Each recessed portion has an opening 61 of greater diameter than that of terminal post 62 which extends therethrough. A fiber washer 63 is arranged on the inside of the member 50 and surrounding the terminal post, and has an integral sleeve extending through the opening 61. A second fiber washer 59 is arranged on the outside of the member 50 and surrounding the sleeve of the washer 53. The terminal post is provided with an enlarged shoulder 64, preferably integral therewith, which engages the inner fiber washer 63. Another fiber washer 65 engages the other side of the shoulder, while a fiber washer 66 is positioned between the washer 63 and the washer 65 and surrounding the periphery of the shoulder 64. A metal plate 67 is placed adjacent the washer 65 and all of the parts are firmly bound together by bolts or rivets 68. The inner end of each terminal post 62 is turned down to provide a pin 69, and these pins are adapted to be engaged by holes in the connection strips 32. When the unitary instrument structure has been placed in its proper position on the posts 53 the connection strips 32 can be readily secured to the pins 69 in any suitable way, as will be evident from Fig. 2 of the drawings.

The glass window 52 is set in putty, cement or similar material so that the joint between the glass and the metal of the cover is water tight. The glass is just enough smaller than the diameter of the cover to drop into position easily. As the diameter of the bottom of the bead 75 is greater than the diameter of the cover proper a wire ring 76 is necessary, at least during the operation of setting the glass, to keep the glass from sliding sidewise. The ring 76 is open at the ends, and it is not material whether the ends come together or not. In assembling, the ring 76 is first put in position and then a quantity of putty or cement is placed roughly around the rim of the cover. The glass 52 is then put in place and pressed down against the inside of the rim, until most of the putty is squeezed out from between the glass and the rim of the cover upon which the glass rests. An open ended wire ring 77 is then sprung in place in the bead 75, and the manner of fitting this ring results in a very secure holding for the glass. Reference to Fig. 3 will show that the ring 77 springs out a little in the bead 75 and if pressure is brought to bear on the outside of the glass the ring 77 will have to close up to the diameter of the main part of the cover before it can leave the bead. The ring is prevented from closing up when such pressure is applied by fitting it so that the ends of the ring close snugly together when the ring is sprung into the bead. Under these conditions the ring cannot close up, and consequently cannot get out of the bead. After the putty or cement gets dry, the glass is held very securely and in a waterproof manner to the cover. The putty or cement is roughly indicated in the drawings by reference character 78, but it will be of course understood that a thin film of putty or cement exists between the glass and the rim of the cover, and probably between all contacting surfaces of the cover, glass and rings.

The cylindrical side wall of the back member 50 is provided with an annular groove 70, and a rubber washer 71 is adapted to be placed in this groove. When the cover member 51 is then forced upon the back member 50 a tight joint is formed between these members by the rubber washer 71. Screws 72 are employed to firmly secure the two members of the instrument casing together. The construction of the inclosing casings for the instrument and of the terminal connection is, accordingly, such that the interior of the casing is waterproof and there is, therefore, no danger of the operative elements of the instrument being injuriously affected by the severe conditions to which an instrument for automobile use is subjected.

The operation of our novel and improved construction of instrument will, it is believed be understood from the foregoing description. The location of the armature of the movable element in the path of the stray field of the permanent magnet provides a construction of instrument possessing distinct advantages over the present construction of instruments of the same general type. The major portion of the flux of the permanent magnet is shunted through the magnetic plate 19, and is very efficiently employed to damp the movement of the moving element, rendering it substantially dead beat, which is a most desirable characteristic in instruments for use on automobiles. The magnetic plate 22 and shielding plates 25 form a magnetic shield about the armature 37 and by adjustment of the shielding plates the amount of stray flux influencing the magnetic armature can be adjusted. The poles of the magnet are cut away on the side near the armature, as indicated in Figs. 7 and 8 of the drawings. This cutting away or shaping of the poles of the magnet keeps down the leakage of flux across the gap between the poles, and concentrates this flux across the gap occupied by the damping disk. It also allows the magnetic armature to be positioned in a weak field remote from the magnet itself without making the instrument objectionably deep.

The magnetic armature is influenced by a sufficient amount of the permanent magnet's flux to be itself constantly polarized. As heretofore stated, however, this requires only a small portion of the total magnet flux and by our improved construction the stray flux of the magnet is employed to maintain the armature polarized. The zero position of the movable element is determined when the magnetic armature extends parallel to a line between the poles of the magnet. The instrument illustrated in the drawings is designed particularly as a battery charge indicator, and is adapted to measure and indicate current flow in either direction. To this end the zero point of the scale is intermediate the ends thereof and the movable element and the magnetic armature are so arranged that the pointer coincides with the zero point when no current is flowing in the stationary coil 30. If the flow of current in one direction, as when the battery is being charged, deflects the pointer toward the left of the scale, the flow of current in the opposite direction, as when the battery is discharging, will deflect the pointer toward the right of the scale. The guard plate 18 is provided with a notched portion, the extremities 74 of which provide stops for the pointer, as will be seen by reference to Figs. 1, 2 and 9 of the drawings.

Numerous modifications and embodiments of our invention without departing from its spirit or scope will be evident to those skilled in the art. It will of course be understood that we do not desire to be limited to the details of construction or to the particular embodiment herein illustrated and described by way of example. We, accordingly, aim in the following claims to cover all modifications of our invention within its spirit and scope.

What we claim as new and desire to secure by Letters Patent of the United States, is:—

1. In an electrical measuring instrument, a permanent magnet, a stationary current carrying coil, a movable armature arranged within the influence of the magnet and coil, a damping member operatively connected to said armature and having a hole therein, a pointer secured to said damping member, a spring clip having two projections extending through said hole, and a threaded counterbalance arm operatively engaging said projections.

2. In an electrical measuring instrument, a permanent magnet, a stationary current carrying coil, a movable magnetic armature arranged within the influence of the magnet and coil, a counterbalance device operatively related to said armature, said device comprising a spring clip having registering apertures therein, and a threaded counterbalance arm extending through said apertures, the material of said clip being so thin that the threads on said counterbalance arm are engaged thereby.

3. In an electrical measuring instrument, a permanent magnet, a stationary current carrying coil, a movable magnetic armature arranged within the influence of the magnet and coil, a counterbalance support operatively related to said armature, a spring clip mounted on said support and having registering apertures therein, means whereby the position of the clip with respect to the support can be adjusted, and a threaded counterbalance arm extending through said apertures, the material of said clip being so thin that the threads on said counterbalance arm are engaged thereby.

4. In an electrical measuring instrument, a permanent magnet, a stationary current carrying coil, a movable magnetic armature arranged within the influence of the magnet and coil, a counterbalance support operatively related to said armature and having a circular hole therein, a spring clip of greater length than the diameter of said hole and having projections extending through said hole, said projections having registering apertures, and a threaded counterbalance arm extending through said apertures, the material of said projections being so thin that the threads on said counterbalance arm are engaged thereby.

5. In an electrical measuring instrument, a permanent magnet, a stationary current carrying coil, a movable magnetic armature arranged within the influence of the magnet and coil, a damping member operatively connected to said armature and having a circular hole therein, a pointer secured to said damping member, a spring clip of greater length than the diameter of said hole and having two projections extending through the hole, and a counterbalance arm operatively threaded in said projections.

6. An electrical measuring instrument comprising a permanent magnet, a magnetic member separated from the poles of said magnet by small air gaps and positioned to provide a path for the greater part of the flux of said magnet, a magnetic shield positioned to provide a path for some of the stray flux of said magnet, a movable element having a damping member movably positioned in said air gaps and a magnetic armature positioned within the influence of the stray flux of said magnet, members of magnetic material adjustably secured to said shield and adapted by their adjustment to vary the amount of stray flux which influences said armature, and a coil operatively related to said armature and arranged to produce a magnetic field at an angle to the magnetic field acting on said armature and due to the stray flux of said magnet.

7. In an electrical measuring instrument, a permanent magnet, two plates of non-magnetic material between which the magnet is clamped, a magnetic shunt supported by one of said plates and separated from the poles of the magnet by small air gaps, a movably mounted magnetic member supported by said plates and arranged to be influenced by a portion of the flux of said magnet, a magnetic shield secured to one of said plates and adapted to regulate the amount of flux influencing said magnetic member, and a coil mounted on said shield in operative relation to said magnetic member and arranged to produce a magnetic field at an angle to the magnetic field acting on said magnetic member and due to the flux of said magnet.

8. In an electrical measuring instrument, a permanent magnet, two plates of non-magnetic material between which the magnet is clamped, a magnetic shunt supported by one of said plates on one side of said magnet and separated from the poles of the magnet by small air gaps, a magnetic shield secured to one of said plates, a pivotally mounted magnetic member, a damping member operatively connected to said magnetic member and positioned in said air gaps, a pointer secured to said damping member and arranged to sweep across a suitable scale, a counterbalance also secured to said damping member, and a coil mounted on said shield in operative relation to said magnetic member and arranged to produce a magnetic field at an angle to the magnetic field acting on said magnetic member and due to the flux of said magnet.

9. In an electrical measuring instrument, a permanent magnet, a main magnetic shunt arranged to form a path for the greater portion of the flux of said magnet, a movably mounted magnetic member positioned in the path of the stray flux of said magnet, an auxiliary magnetic shunt operatively related to said magnetic member and adapted to shield said member, means coöperating with said auxiliary shunt whereby the amount of flux passing therethrough can be adjusted thereby also adjusting the amount of stray flux influencing said magnetic member, a damping member operatively connected to said magnetic member and positioned to be influenced by the flux passing through said main magnetic shunt, and a coil operatively related to said magnetic member and arranged to produce a magnetic field at an angle to the magnetic field acting on said magnetic member and due to the flux of said magnet.

10. In an electrical measuring instrument, a permanent magnet, two plates of non-magnetic material between which the magnet is clamped, a magnetic shunt supported by one of said plates and separated from the poles of the magnet by small air gaps, a movably mounted magnetic member supported by said plates and arranged to be influenced by a portion of the flux of said magnet, a magnetic shield secured to one of said plates, means attached to said shield for adjusting the amount of flux influencing said magnetic member, a damping member operatively connected to said magnetic member and positioned in said air gaps, a pointer secured to said damping member and arranged to sweep across a suitable scale, a counterbalance also secured to said damping member, and a coil mounted on said shield in operative relation to said magnetic member and arranged to produce a magnetic field at an angle to the magnetic field acting on said magnetic member and due to the flux of said magnet.

In witness whereof, we have hereunto set our hands this 1st day of May 1914.

WILLARD E. PORTER.
ALVARADO L. R. ELLIS.

Witnesses:
 JOHN A. McMANUS, Jr.,
 ROBERT SHAND.